Sept. 25, 1956      H. L. MENDENHALL      2,764,281
AUTOMOBILE ASH TRAY HAVING EXHAUST
ACTUATED EVACUATING STRUCTURE
Filed Oct. 26, 1954

INVENTOR.
Henry L. Mendenhall

BY

ATTORNEY.

United States Patent Office 2,764,281
Patented Sept. 25, 1956

2,764,281

AUTOMOBILE ASH TRAY HAVING EXHAUST ACTUATED EVACUATING STRUCTURE

Henry L. Mendenhall, Kansas City, Mo.

Application October 26, 1954, Serial No. 464,844

1 Claim. (Cl. 206—19.5)

This invention relates to smoking appliances and, more particularly, to the disposal of cigarette and cigar ashes and butts from the receptacles or ash trays commonly provided therefor in automobiles and other passenger vehicles.

The most important object of the present invention is the provision of apparatus coupled with the ash trays in an automobile for creating a partial vacuum therein and thereby discharging the contents of the ash trays from the automobile.

A further important object of the present invention is to provide, as a component part of the apparatus above-mentioned, a vacuum device which is associated with the exhaust pipe of the internal combustion forming a part of an automobile and which communicates with the ash trays in the automobile through suitable, flexible tubing.

With these and other objects in view, the ash tray evacuating structure of the present invention comprises, generally, a vacuum device in the nature of an exhaust pipe extension which, when the engine is in operation, creates a partial vacuum in a network of flexible tubing leading from the vacuum device to the various ash trays.

Other objectives of the present invention include the manner in which the above-mentioned vacuum device is attached to the exhaust pipe of the automobile; the manner in which the engine exhaust is utilized to create the necessary, partial vacuum in the ash trays and the flexible tubing; and other, more minor objects which will become apparent in the specification which follows:

Figure 1:
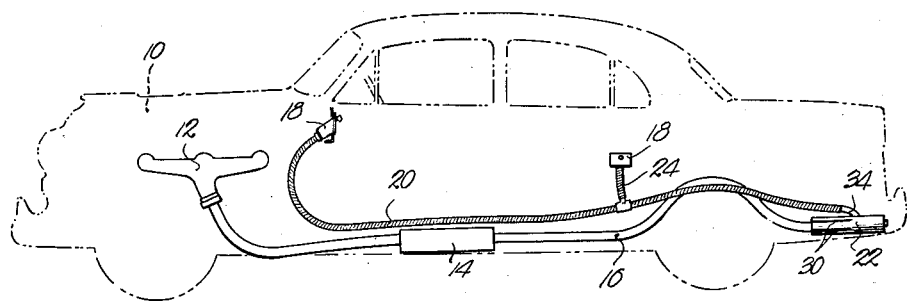
Figure 1 is a side, elevational view, with the exhaust and vacuum lines of the present invention shown schematically, the automobile with which they are associated being shown in dotted lines.

Referring now to the drawing, wherein like numerals indicate similar parts, the ash tray evacuating structure of the present invention is shown in association with an automobile 10 having a conventional manifold 12, muffler 14 and exhaust pipe 16, as well as a number of conventional ash trays 18. The evacuating structure includes, as elements thereof, a length of flexible, metallic tubing 20 leading from one of the ash trays 18, a vacuum device designated broadly by the numeral 22 and a branch 24 interconnecting each of the remaining ash trays 18 with tubing 20.

Figure 5:
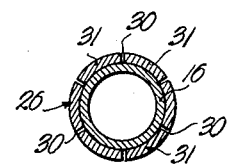
Fig. 5 is a vertical, sectional view taken on line V—V of Fig. 3.
Figure 3:
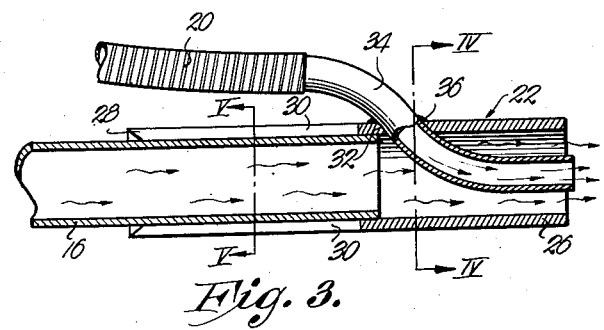
Fig. 3 is an enlarged, fragmentary, side elevational view of the vacuum device forming a part of the present invention, parts being broken away and in section to reveal details of construction.
Figure 4:
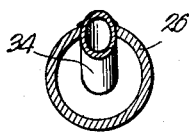
Fig. 4 is a vertical, sectional view taken on line IV—IV of Fig. 3.

Viewing Fig. 3, it is seen that vacuum device 22 includes a pipe section 26 having an inside diameter slightly less than the outside diameter of exhaust pipe 16. At one end thereof, pipe section 26 is provided with an inwardly beveled surface 28, which facilitates the telescoping of pipe section 26 on exhaust pipe 16. Furthermore, pipe section 26 is split longitudinally from the beveled surface 28 through a portion of its length and at spaced intervals throughout its periphery, as indicated by the numeral 30. The split portion of pipe section 26, consisting of longitudinal end segments 31, is best illustrated in Fig. 5.

Intermediate its ends, pipe section 26 is provided with an opening 32, through which extends an irregularly shaped, tubular member 34. Member 34 has an intermediate length which is disposed angularly with respect to pipe section 26 and joined integrally therewith by welds 36. Adjacent each end, member 34 is bent upon itself to present a length which is substantially parallel with the pipe section 26, the inner length terminating in coaxial alignment with pipe section 26 and exhaust pipe 16.

The flexible tubing 20 is telescoped, at one end thereof, on the tubular member 34 and at its opposite end, is placed in communication with one of the ash trays 18.

Figure 2:
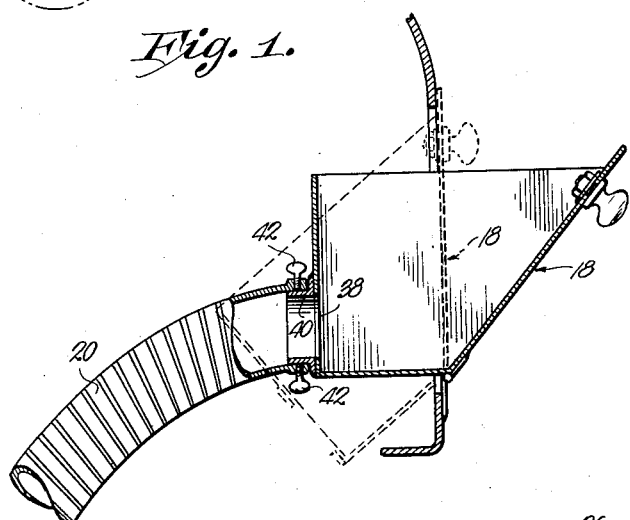
Fig. 2 is an enlarged, fragmentary, side elevational view of one of the ash trays shown in Fig. 1, parts being broken away and in section to reveal details of construction.

As shown in Fig. 2, an otherwise conventional ash tray 18 is provided with an opening 38 in one wall thereof and with a bracket 40 which surrounds the opening 38. The bracket 40 receives the tubing 20, the latter being rigidly fastened to the bracket by means of metal screws 42. When ash tray 18 is moved to and from the closed position, flexible tubing 20 moves therewith, substantially as illustrated in Fig. 2.

In actual practice, it has been found satisfactory to place one length of flexible tubing 20 between vacuum device 22 and the ash tray 18 in automobile 10 which is farthest removed from pipe section 26. The remaining ash trays 18 are coupled with tubing 20 by means of branches 24 in any suitable manner (not shown), the individual branches 24 being coupled with the respective ash trays 18 as illustrated in Fig. 2.

When an ash tray 18 is opened and used for the purpose intended, it is seen that, whenever the engine of automobile 10 is in operation, the flow of exhaust gases in exhaust pipe 16 and pipe section 26 creates a partial vacuum in tubular member 34 and tubing 20. This vacuum is sufficient to evacuate the ash tray 18 of its waste contents as the latter accumulate. Manifestly, this action is much more positive when only one ash tray 18 is open, but it has been found that the apparatus of the present invention will function properly when two or more ash trays 18 are placed in use simultaneously.

In installation, the vacuum device 22 illustrated in Fig. 3 is attached to the exhaust pipe 16 by telescoping the same thereon. As mentioned previously, the exhaust pipe 16 has a slightly greater outside diameter than the inside diameter of pipe section 26, so that when the split end of the pipe section 26 is telescoped on exhaust pipe 16, the pipe section 26 will remain on exhaust pipe 16 in press-fit relationship thereto during normal operation of the internal combustion engine of automobile 10. Vacuum device 22 is placed in communication with the specially adapted ash trays 18 by means of flexible tubing 20 and its branches 24. The specific location of the inner end of tubular member 34 in coaxial alignment with the pipe section 26 at the outermost end of the latter is of the utmost importance to the present invention since this construction has been found to yield the maximum possible, partial vacuum in tubing 20 and its branches 24.

It is obvious that the embodiment herein disclosed is a preferred form only and that many changes or modifications may be made therein without departing from the broad principles of the present invention. Such changes or modifications are contemplated hereby and it is, therefore, desired to be limited only by the scope of the appended claim.

Having thus described the invention what is claimed as new and desired to be secured by Letters Patent is:

In an automobile having an ash tray therein and an engine provided with a rearwardly extending exhaust pipe, apparatus for emptying the ash tray of its waste contents, said apparatus comprising an elongated, tubular, cylindrical extension split longitudinally into segments at the front end thereof and inwardly beveled at said end thereof to adapt the same for telescoped, press fitting on the exhaust pipe; a unitary, tubular member extending into said extension intermediate the ends thereof, said member being bent upon itself to present an intermediate length disposed at an acute angle with respect to the longitudinal axis of the extension, a first end length in substantial parallelism with the longitudinal axis of the extension and exteriorly of the latter and a second end length in coaxial alignment with the longitudinal axis of the extension within the latter, said second length terminating in an open end disposed immediately outside and to the rear of the rearmost end of the extension; and a flexible, metallic tube communicating at one end thereof with said ash tray and, at its opposite end, with said first end length of the tubular member whereby to create a vacuum in said tube and thereby the tray when the engine is in operation.

References Cited in the file of this patent

UNITED STATES PATENTS

| | | |
|---|---|---|
| 818,036 | Martindale | Apr. 17, 1906 |
| 1,684,973 | Sears | Sept. 18, 1928 |
| 2,299,668 | Webster | Oct. 20, 1942 |
| 2,308,607 | Jackson | Jan. 19, 1943 |

FOREIGN PATENTS

| | | |
|---|---|---|
| 41,367 | Norway | May 18, 1925 |